US010239489B2

(12) United States Patent
Liubakka et al.

(10) Patent No.: US 10,239,489 B2
(45) Date of Patent: Mar. 26, 2019

(54) VEHICLE ACCESS SYSTEM WITH INADVERTENT ACTUATION CONTROL

(71) Applicant: Dura Operating LLC, Auburn Hills, MI (US)

(72) Inventors: Michael K. Liubakka, Northville, MI (US); Thomas Farges, Gometz le chattel (FR); Joseph Lewis, Rochester Hills, MI (US); Benjamin Saltsman, Bloomfield Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 14/851,794

(22) Filed: Sep. 11, 2015

(65) Prior Publication Data

US 2017/0072908 A1    Mar. 16, 2017

(51) Int. Cl.
*B60R 25/23* (2013.01)
*G07C 9/00* (2006.01)

(52) U.S. Cl.
CPC ............ *B60R 25/23* (2013.01); *G07C 9/0069* (2013.01); *G07C 2209/08* (2013.01)

(58) Field of Classification Search
CPC .......................... B60R 25/23; G07C 9/00126
See application file for complete search history.

(56) References Cited

U.S. PATENT DOCUMENTS

| 5,887,466 | A | * | 3/1999 | Yoshizawa | .......... | B60R 25/1001 |
| | | | | | | 292/201 |
| 5,933,086 | A | * | 8/1999 | Tischendorf | ........ | E05B 47/0661 |
| | | | | | | 340/12.22 |
| 6,018,291 | A | * | 1/2000 | Marble | .................... | B60R 25/04 |
| | | | | | | 180/287 |
| 6,097,306 | A | * | 8/2000 | Leon | ........................ | G07C 1/32 |
| | | | | | | 340/10.1 |
| 6,606,492 | B1 | * | 8/2003 | Losey | ..................... | B60R 25/04 |
| | | | | | | 307/10.2 |
| 6,768,428 | B1 | | 7/2004 | Readler | | |
| 6,982,626 | B2 | | 1/2006 | Nedorezov | | |
| 7,106,171 | B1 | | 9/2006 | Burgess | | |

(Continued)

FOREIGN PATENT DOCUMENTS

| GB | 2345567 A * | 7/2000 | ............ H03M 11/22 |
| KR | 20110085679 A * | 7/2011 | |
| WO | WO2009036552 A1 | 3/2009 | |

OTHER PUBLICATIONS

EP Extended Search Report for EP Application No. 16186858.3 dated Feb. 24, 2017 (12 pages).

*Primary Examiner* — Tuan C To
(74) *Attorney, Agent, or Firm* — Reising Ethington P.C.; Matthew J. Schmidt; Robert E. Ford (57) ABSTRACT

In at least some implementations, a method for preventing inadvertant operation of a vehicle access system that includes a plurality of inputs involves providing a keypad operable to output signals to control a vehicle system based on entry of a code via the inputs, detecting when a predetermined access sequence is inputted via the inputs and outputting a signal to a vehicle system to allow access to the vehicle, and operating the keypad in a disabled mode wherein the keypad output signals are not outputted. The disabled mode may be activated either actively or passively or both, and the disabled mode may be terminated either actively or passively or both.

22 Claims, 4 Drawing Sheets

(56) References Cited

U.S. PATENT DOCUMENTS

| | | | | |
|---|---|---|---|---|
| 7,228,213 B2* | 6/2007 | Sakai | | B60K 28/00 701/49 |
| 7,388,465 B2* | 6/2008 | Simon | | G06Q 20/102 235/382 |
| 7,484,391 B1* | 2/2009 | Moore | | B65D 90/008 292/144 |
| 7,796,021 B2* | 9/2010 | Saban | | B60N 2/002 340/438 |
| 7,882,361 B2* | 2/2011 | Williams | | G06F 21/31 713/185 |
| 8,405,527 B2 | 3/2013 | Chung et al. | | |
| 8,436,721 B1* | 5/2013 | Lee | | B60R 25/23 180/173 |
| 8,902,040 B2* | 12/2014 | Greisen | | G07C 9/00571 340/5.1 |
| 9,002,536 B2* | 4/2015 | Hatton | | B60R 25/24 340/426.13 |
| 9,406,182 B2* | 8/2016 | Gartner | | G07C 9/0069 |
| 9,452,735 B2* | 9/2016 | Miller | | B60R 25/20 |
| 2004/0027238 A1 | 2/2004 | Magner et al. | | |
| 2004/0124968 A1* | 7/2004 | Inada | | B60R 25/2081 340/5.72 |
| 2005/0242923 A1* | 11/2005 | Pearson | | G07C 9/00309 340/5.62 |
| 2006/0056663 A1* | 3/2006 | Call | | B60R 25/25 382/115 |
| 2006/0145825 A1* | 7/2006 | McCall | | B60R 25/2045 340/426.35 |
| 2006/0186987 A1* | 8/2006 | Wilkins | | B60R 25/252 340/5.53 |
| 2007/0001826 A1* | 1/2007 | Lanier | | B60R 25/04 340/425.5 |
| 2007/0285209 A1* | 12/2007 | Heusi | | G06Q 10/02 340/5.23 |
| 2008/0070616 A1* | 3/2008 | Yun | | G06F 3/0482 455/550.1 |
| 2009/0096596 A1* | 4/2009 | Sultan | | G07C 5/008 340/426.13 |
| 2009/0256677 A1* | 10/2009 | Hein | | B60R 25/00 340/5.72 |
| 2010/0075656 A1* | 3/2010 | Howarter | | B60R 25/2009 455/420 |
| 2010/0321173 A1* | 12/2010 | Magner | | G07C 9/00182 340/426.1 |
| 2012/0209454 A1* | 8/2012 | Miller | | B60W 50/12 701/2 |
| 2013/0079998 A1* | 3/2013 | Furness | | B60S 3/00 701/49 |
| 2014/0015637 A1 | 1/2014 | Dassanayake et al. | | |
| 2014/0316609 A1 | 10/2014 | Washington et al. | | |
| 2015/0102898 A1* | 4/2015 | Huennekens | | G07C 9/00111 340/5.6 |
| 2015/0353033 A1* | 12/2015 | Pribisic | | H03K 17/962 307/115 |
| 2016/0244029 A1* | 8/2016 | Weston | | B60T 7/12 |

* cited by examiner

VEHICLE ACCESS SYSTEM WITH INADVERTENT ACTUATION CONTROL

TECHNICAL FIELD

The present disclosure relates to a vehicle access system with inadvertent actuation control.

BACKGROUND

Some vehicles include a keypad or other system to permit secure access to a vehicle interior from the exterior of the vehicle. To gain access to a locked vehicle having a keypad a code is entered into the keypad by depressing a series of buttons (often numbered) or by touching the keypad in the area of sensors which detect or register the touch. When the correct code is entered, the state of a vehicle door lock may be changed from locked to unlocked, or vice versa. The keypad sensors may be capacitive and/or touch sensitive and such sensors may be inadvertently actuated by inadvertent human touches, or by water or other capacitive media on the keypad such as may occur during a rain storm or a vehicle car wash.

SUMMARY

In at least some implementations, a method for preventing inadvertant operation of a vehicle access system that includes a plurality of inputs involves providing a keypad operable to output signals to control a vehicle system based on entry of a code via the inputs, detecting when a predetermined access sequence is inputted via the inputs and outputting a signal to a vehicle system to allow access to the vehicle, and operating the keypad in a disabled mode wherein the keypad output signals are not outputted. The disabled mode may be activated either actively or passively under a variety of predefined circumstances, such as (but not limited to), entry of one or more codes, movement of the vehicle, the vehicle transmission being in a gear other than park, or when water is detected at the keyboard or inputs.

In at least some implementations, a method for preventing inadvertent activation of a vehicle door lock by an access control device that includes multiple inputs that may be activated individually or collectively to provide an output signal to a controller communicated with the vehicle door lock to selectively change the state of the vehicle door lock, includes actively or passively activating a disabled mode of the access control device to prevent activation of the vehicle door lock when the disabled mode is activated.

The disabled mode may be activated and terminated by various active and passive ways, where active ways involve user action and passive ways may be independent of user action. For example, a passive disenablement requires no action from a user and is implemented automatically by one or more vehicle control systems or controllers. Representative examples include automatic disablement of the keypad (or related controller) upon detecting movement of the vehicle, detecting that the vehicle is in a gear other than park, as a function of the location of the vehicle, or upon sensing water at or on the keypad. Active user disablement may also be permitted and are directly and intentionally controlled by the user. Representative examples include user entry of desired code via the keypad inputs or other manipulation of the keypad inputs or via a vehicle infotainment or other user controlled vehicle system.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figure 1:
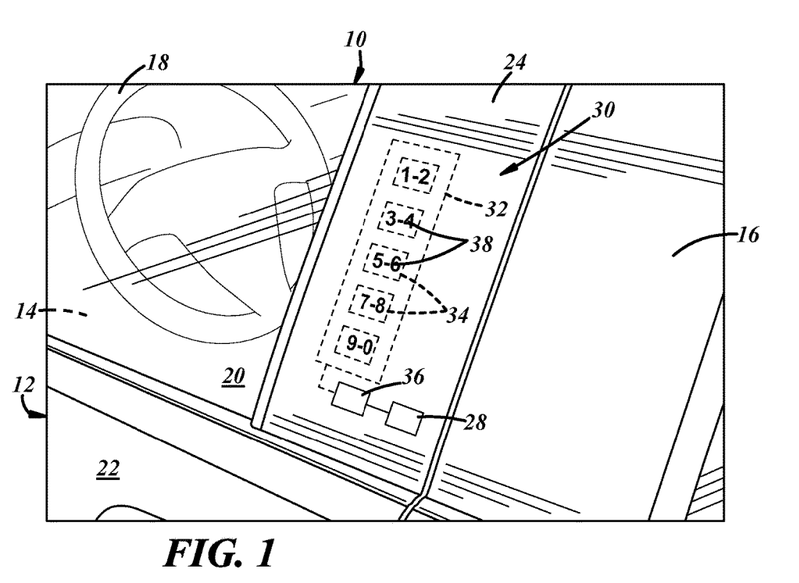
FIG. 1 is an enlarged, fragmentary view of a portion of the vehicle including a keypad.

Referring in more detail to the drawings, FIG. 1 illustrates a passenger vehicle 10 having a door 12 that may be closed and locked to inhibit access to, and unlocked and opened to permit access to, a passenger compartment 14 of the vehicle 10. The portion of the vehicle 10 shown in FIG. 1 includes part of the driver's side door 12, B-pillar 16 and a portion of the passenger compartment 14 including a steering wheel 18 can be seen through a window 20 in the driver's side door 12. The door 12 may include a frame, an exterior panel 22 on the frame and the window 20 which may move up and down between open and closed positions. A capping or trim piece 24 may be located adjacent to at least part of the window 20, and may define or cover part of a window frame. In FIG. 1, such a trim piece 24 extends vertically along a side of the window 20 (and may cover the side edge of the window and a guide track or frame in which the window moves) adjacent to and, in at least some implementations, overlapping and covering part of the vehicle B-pillar 16.

To control actuation of a lock 28 associated with the door 12, a vehicle access system 30 may include an access control device which may include a keypad 32 having one or more inputs 34 and a controller 36. Additionally, a wireless remote control device such as a key FOB or a NFC device, may be used for control of the vehicle door lock. In the implementation shown, the keypad 32 is located within the window trim piece 24, and may be embedded there for improved appearance and protection from the exterior environment and contaminants. In such implementations, the trim piece 24 may define a contact surface for the keypad, and may be translucent or transparent to permit light transmission therethrough, such as LED lighting of the keypad or surrounding area to facilitate viewing the keypad and its inputs. Other locations for the keypad may also be used, such as in the door panel, on or near a door handle, and the like. The keypad inputs 34 may include one or more buttons or sensors that are coupled to or communicated with the controller 36 so that actuation of the inputs 34 provides an output signal or signals to the controller 36. The input or inputs 34 may be individually or otherwise actuated to permit entry of a code recognizable by the controller 36. And the inputs 34 may be manually actuated such as by pressing a finger against or passing a finger near a sensor or button of the input. In response to one or more predetermined output signals from the inputs 34, the controller 36 may provide an output that controls a vehicle system, such as changing the state of a vehicle door lock 28 from locked to unlocked or vice versa, opening a vehicle trunk, or the like.

In the example shown in FIG. 1, the keypad 32 includes a plurality of inputs 34 that are capacitive or touch sensitive or both, and include discrete sensors beneath a finish surface which may be smooth and free of depressions or protrusions, if desired. The area outboard of and overlying each sensor 34 may include certain indicia 38 (e.g. on the trim piece 24, or beneath the surface of the trim piece) to identify the effective region or area of the sensor, to facilitate user interaction with the sensor. As shown, the area of each sensor 34 includes one or more numbers to aid a user in sequentially entering a code having any desired quantity of places (where each number is one place), such as 13435 or 2367. In the example shown, five inputs 34 (e.g. sensors) are provided and each sensor has two numbers associated therewith providing number options beyond just 1-5 and including 0-9. Any indicia may be used instead of or in addition to numbers, such as letters, symbols, pictures, depressions or protrusions.

In the example of capacitive touch sensitive inputs 34, water and other conductive materials may erroneously cause actuation of the inputs and this can lead to inadvertent or unintentional actuation of the door lock(s) 28 or other system controlled or controllable by the keypad 32. Hence, when it is raining or the vehicle 10 is traveling through a carwash such that water contacts the keypad 32, an erroneous or inadvertent actuation of the door locks 28 may occur which is generally not desirable.

For example, some vehicle users do not know the door lock activation code, for example, a user who is not the owner of the vehicle, or who does not use the keypad 32 to lock or unlock the vehicle doors. So an inadvertent locking of the vehicle doors 12 when the keys are inside the vehicle 10 is undesirable. This may occur when the vehicle 10 is left running (e.g. to let it warm up) while it is raining or snowing, and the rain or snow may actuate the keypad 32 and cause an unintended locking of the door 12. In some carwashes, the driver of the vehicle 10 is not present within the vehicle as the vehicle moves through the carwash facility. An unintended locking of the door 12 in that situation may cause an issue when an employee of the carwash is unable to get into the vehicle 10, and the driver or owner of the vehicle is not nearby to or is otherwise unable to enter the code into the keypad 32 to unlock the door. Hence, the carwash employee may be unable move the vehicle 10 out of the carwash line and the carwash line must be stopped to prevent other vehicles from colliding with the locked vehicle. These are just a couple situations where unintended inadvertent actuation of the keypad 32 can cause a problem.

To inhibit or prevent unintended actuation of vehicle access system 30 via the keypad 32, the system 30 may provide one or more ways to either override, ignore or disable the keypad inputs 34 and/or the controller 36, or otherwise ignore controller output signals or not cause the controller to send output signals, in certain situations. The ignoring, overriding or disabling may remain for a certain duration of time, number of times the vehicle (e.g., vehicle engine) is started, actuation of a vehicle door handle (e.g. opening the driver's door), until a certain code is entered into the keypad 32 or some other threshold is reached or event occurs. Further, the ignoring, overriding or disabling may occur automatically upon sensing certain conditions or events, or by user control, such as by entering a certain code into the keypad 32 or otherwise actuating one or more of the inputs 34 in a certain manner.

For ease of description, any state in which the keypad inputs 34 are not operable to perform the intended function (e.g. control a door lock) will hereafter be called a disabled mode, and is intended to include ignoring, overriding, disabling or otherwise rendering the keypad or a controller associated therewith unable to perform a function that the keypad or controller could otherwise perform.

For example, the keypad inputs 34 may be disabled whenever the vehicle 10 (e.g. the vehicle transmission) is in a gear other than park. Because the keypad 32 is located on an exterior of the vehicle 10, it can be assumed that genuine or intended actuation of the keypad 32 will only occur when the vehicle 10 is in park. In the carwash example, vehicles are usually placed into a neutral gear when moving through a carwash so the keypad in this scenario would be disabled because the vehicle transmission is not in park. Similarly, the keypad 32 may be disabled anytime the vehicle 10 is determined to be moving, that is, not stationary. Again, it may be assumed that genuine or intended keypad actuation will not occur when the vehicle 10 is in motion and should only occur when the vehicle is stationary. Further, the presence of water at or near the keypad 32 or its inputs 34 may be detected and the disabled mode of the keypad may be activated.

Still further, the vehicle may include some sensors, telematics or communication equipment and signals or information therefrom may be used to determine that the vehicle is in or near a location wherein disablement is desired, and that may cause activation of the disabled mode. In one example, geospatial information, GPS, GNSS or map data, may be used to determine the vehicle proximity to a car wash and cause disablement based on such proximity alone or in combination with other factors (e.g. vehicle speed, time near the car wash, etc, which may help to determine if the vehicle is stopping at the car wash or merely passing by). WIFI, RF, LAN, or other signals may also be transmitted between a car wash and the vehicle, and within a vehicle via a vehicle CAN/LIN, to aid in determining the vehicle proximity to a car wash and subsequent activation of the disabled mode. Further, vehicle sensors and cameras may be used to detect vehicle proximity to a car wash (e.g. camera detection of a car wish sign) to activate the disabled mode as desired. While described with reference to a car wash, the vehicle proximity to other locations may also be used to activate the disabled mode, a car wash is just one example for ease of description herein. Further, when proximity to a car wash is determined by a first sensor (e.g. GPS, RF, or the like), a second sensor may be used to confirm this, such as a sensor or other means to detect water on the vehicle. Hence, in at least some implementations, disabled mode would only be activated when signals from both sensors (or at least two) provide a suitable indication.

The various disablements noted above may be considered passive because the user need not do anything with regard to the keypad 32 to cause the disablement. Other passive disablements may also be used, the above examples are not intended to be an exhaustive list of passive disablements.

The keypad 32 may also be disabled in one or more ways by the user and these disablements may be considered to be active disablements because they require some affirmative action on the part of the user. Representative active disablements include actuation of one or more inputs 34 in a predetermined manner, such as: repeated actuation of a single input (e.g. actuating the same sensor several times consecutively), one lengthy actuation of a single input (e.g. actuating for 3 continuous seconds), actuation of a specific code (e.g. actuating sensor corresponding to 9191 or other code), simultaneous actuation of multiple inputs (actuating two or more inputs at the same time, either once, once and holding the actuation for a certain time, or multiple consecutive actuations of the same multiple inputs), or the like. Multiple such actuations may be used in combination. Further, instead of discrete sensors/inputs 34, the keypad may include one sensor with multiple areas the actuation of which may be differentiated or determined so that the location of touch or actuation may be determinable by the system. In this way, actuating or touching different portions of the sensor equates to actuating different sensors. With such a sensor, and even with multiple sensors 34, a pattern may be traced by a user (e.g. drawing a line, letter(s), numbers, etc, by moving a user's finger along the sensor), and the pattern may be recognizable as a code to activate the disabled mode of the keypad 32 or associated controller 36. Additionally, a vehicle infotainment or other interactive control system (interactive in the sense that the user may make selections among multiple options) may permit the user to activate or terminate the disabled mode via one or more commands or prompts provided from such system to the vehicle access system.

Further, the disabled mode may remain in effect until a specific code (e.g., enable code) is manually entered into the keypad 32 (thereby ending the disabled mode), or the disabled mode is manually terminated via a vehicle infotainment or interactive system, or for a specific time period, or until water is no longer detected, or until the vehicle is no longer moving, or until it is determined that the vehicle is no longer in or near a particular geographic location (e.g. a carwash), or until the vehicle (e.g. its engine) is shutdown and restarted, etc. When user action is required to terminate the disabled mode such termination may be deemed to be active, and when user action is not required to terminate the disabled mode such termination may be deemed passive. Hence, the system disabled mode may actively or passively activated, and the system disabled mode may be actively or passively terminated. In some instances, the vehicle may be shipped with the access system in the disabled mode so that the system is not actuated during, for example, vehicle final assembly and delivery of the vehicle to a vehicle dealership or customer. In these instances, an initial activation code may be entered into the keypad to terminate the disabled mode and activate the keypad. This initial keypad activation may also occur passively such as by determination that the vehicle is located at a dealership (with geospatial information, communication with some device or network at the dealership and the vehicle, etc) and then activating the keypad without direct manipulation of the keypad.

In at least some embodiments, the user may actively choose among various enablement modes. For example, when actively initiating the disabled mode, a user may use the keypad 32, and the sensors/inputs 34 thereof, in particular, to select a desired mode from a plurality of different disabled modes. For example, in an embodiment, the user may be able to select among different disabled modes that provide different features, and in particular, either passive or active enablement or system reactivation out of disabled mode. Hence, by manipulation of the keypad in a predetermined manner (e.g. entry of a code) the user may select a disabled mode that requires user action to terminate the disabled mode (e.g. active enablement) or the user may select a disabled mode that permits passive termination of the disabled mode (e.g. passive enablement, such as enablement after some duration of time, among other options as noted above). In such an embodiment, for example, an actuation of one or more inputs 34 in a particular manner may activate the disabled mode generally, and then the subsequent actuation of one or more inputs 34 in a particular manner may activate a specific disabled mode. That is, each type of disabled mode may have its own manner of being selected and implemented, such as by entry of different codes, one assigned to the different disabled modes. By way of illustration, in one non-limiting example the continued actuation of an input (e.g., input "1-2") for a predetermined amount of time (e.g., 7 seconds) may activate the disabled mode. Following the activation of the disabled mode generally, the actuation of one input (e.g., input "5-6") followed by a second actuation of the same input may cause the one particular disabled mode to be activated. Alternatively, the actuation of one input (e.g., input "5-6") followed a subsequent actuation of a different input (e.g., input "9-0") may cause a different one of the disabled modes to be activated. And the actuation of one input (e.g., input "9-0") followed by a second actuation of the same input may cause yet another disabled mode to be activated.

As with the activation of the disabled mode generally, in at least some embodiments, the activation of a particular disabled mode may be indicated via the keypad 32 by the visual or tactile means described above. For example, the activation of a particular mode may be indicated by flashing of the illumination source (e.g. LED or other light source) associated with the inputs 34 or keypad 32 a certain number of times corresponding to that particular mode.

While certain inputs for activating different disabled modes, and certain indicators indicating the activation of those modes have been described above, it will be appreciated that other inputs or input combinations/sequences and/ or indicators may certainly be used instead as the present disclosure is not limited to any particular inputs and/or indicators.

Figure 2:
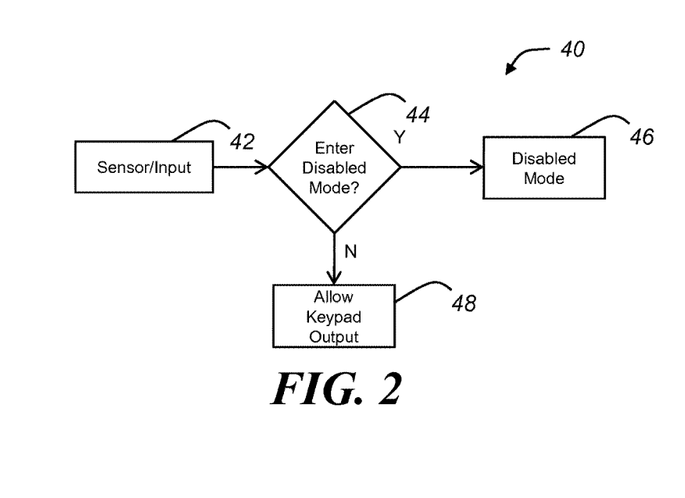
FIGS. 2-5 are flow charts of control systems for a vehicle access system.
Figure 4:
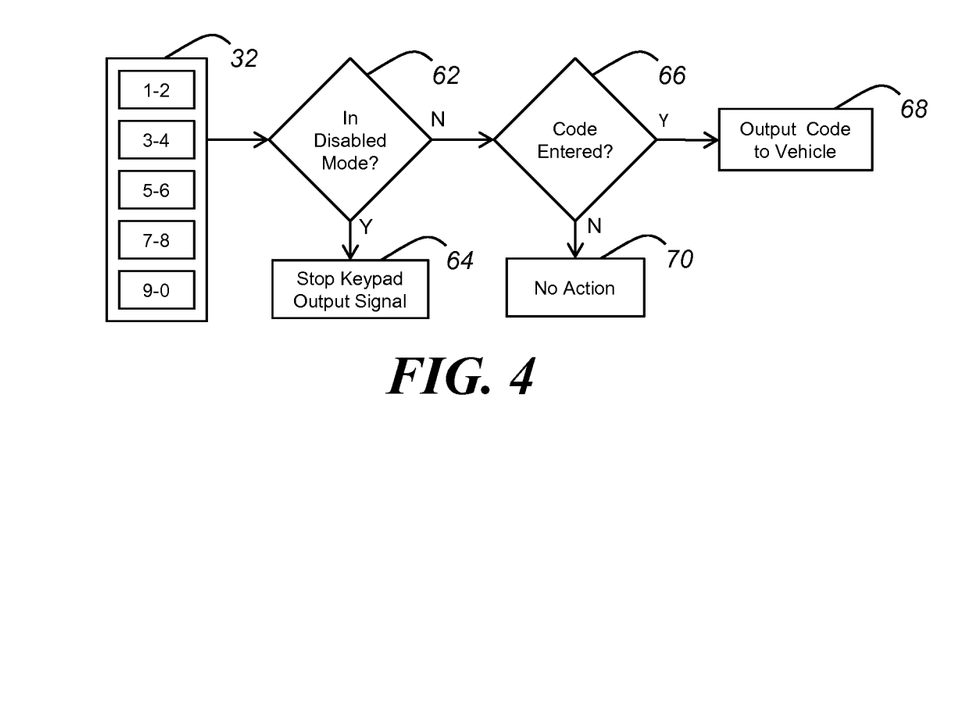

FIG. 2 shows a simple control scheme 40 to determine whether the disabled mode is to be initiated. Sensor data, input activation and the like is used at 42 to determine at 44 whether disabled mode is to be initiated. If disabled mode is to be initiated, then keypad use and outputs therefrom are not permitted at 46, and if disabled mode is not initiated then keypad use and outputs therefrom are permitted at 48. FIG. 4 shows a control scheme 60 to determine when active termination of the disabled mode occurs. The keypad is shown at 32 and if disabled mode is initiated at 62 then keypad outputs are disabled at 64. If disabled mode has not been initiated, then code entry at 66 is outputted at 68. If no code is entered at 66 then no action is taken as represented at 70.

Figure 5:
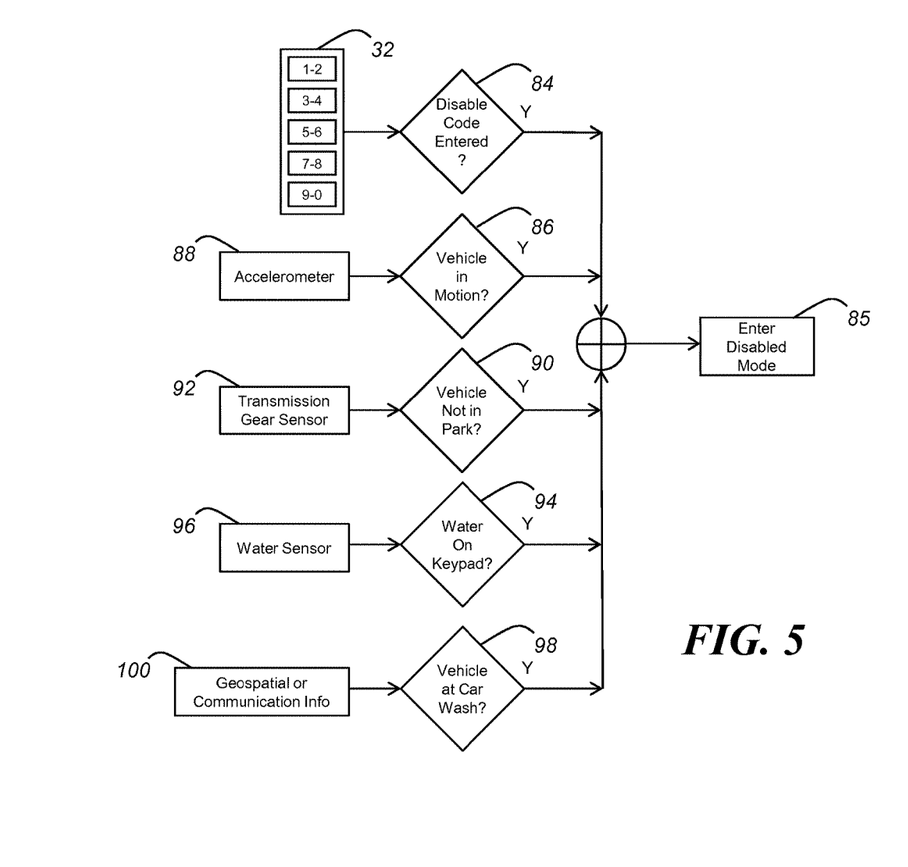

FIG. 5 shows a control 80 scheme regarding initiation of disabled mode at 82 either actively or passively. Active initiation of the disabled mode is shown at 84 which determines if a disable code has been entered via the keypad 32 and, if so, disabled mode is initiated at 85. Passive initiations of disabled mode are shown at: a) 86 which uses an accelerometer 88 to determine if the vehicle is in motion and, if so, disabled mode is initiated at 85; b) 90 which determines if the transmission 92 is in a gear other than park and, if so, disabled mode is initiated at 85; c) 94 which uses a water sensor 96 to determine if water is present at the vehicle exterior (e.g. at the keypad) and, if so, disabled mode is initiated at 85; and d) 98 which uses information 100 relating to the vehicle location (geospatial information or communication with the vehicle) to determine if the vehicle is at a car wash, and if so, then disabled mode is initiated at 85. It is noted that FIG. 5 only shows positive responses from decision blocks 84, 86, 90, 94 and 98. Negative responses may be ignored in that no action need be taken unless the stated condition in each decision block is met.

Figure 3:
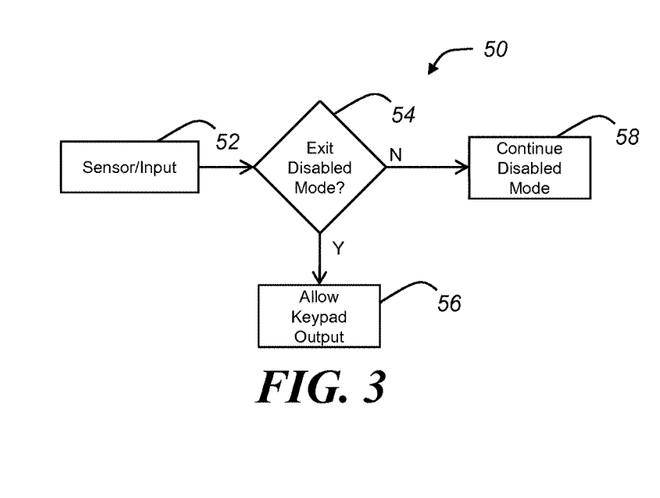

Similar actuations as noted above may be used to terminate the disabled mode, or re-enable a disabled keypad, if desired. The re-enablement actuations may be the same as or different than the disabling code (e.g., ending the disabled mode is activated by the controller 36 detecting the entry of an enable code via the inputs 34), as desired. And the above noted disablements could be used in any desired combination, including combinations of passive, active or both passive and active disablements. FIG. 3 shows a simple control scheme 50 to determine whether the disabled mode is to be terminated. Sensor data, input activation and the like is used at 52 to determine at 54 whether disabled mode is to be terminated. If disabled mode is to be terminated, then keypad use and outputs therefrom are permitted at 56, and if disabled mode is not terminated then disabled mode continues at 58.

The vehicle 10 may provide a response to the user upon disablement or re-enablement of the keypad 32. The response could be provided via the keypad 32 by visual or tactile means, such as flashing an illumination source (e.g. LED or other light source) associated with the inputs 34 or keypad 32 generally one or a plurality of times, changing the state of an illumination source (e.g. turning an illumination source off upon disablement or on upon re-enablement) or by actuation of an audible signal or alarm, or actuation of a vibrating or other haptic feedback device. The response could also involve other vehicle systems, like the vehicle horn, lights (interior or exterior) or the like.

FIG. 2 is a simplified flow chart of one control system for activating a vehicle door lock. At 50 it is determined if the keypad 32 is being operated in the disabled mode. If the keypad 32 is being operated in the disabled mode, any keypad inputs 34 are disabled or disregarded by the controller 36 at 52 (i.e., not outputted by the controller) so that inadvertent input actuation cannot activate the door lock 28. If the keypad 32 is not being operated in the disabled mode, then it is determined at 54 if the correct code was entered at the keypad 32 via the inputs 34. If the correct code was entered, then the door lock 28 is activated at 56; otherwise, no action is taken at 58.

FIG. 3 is simplified flow chart of another control system for activating a vehicle door lock. At 60 it is determined if a correct disable code was entered at the keypad 32 via the inputs 34. If a correct disable code was entered, any keypad inputs 34 are disabled or disregarded by the controller 36 at 62 (e.g., are not outputted by the controller) so that inadvertent input actuation cannot activate the door lock 28. If a correct disable code was not entered, then an accelerometer or other device 64 is used to determine if the vehicle 10 is in motion at 66. If the vehicle 10 is in motion, any keypad inputs 34 are, as described above, disabled or disregarded by the controller 36 at 62 e.g., are not outputted by the controller). If the vehicle 10 is not moving, then the door lock 28 is only activated at 60 upon entry of the correct code at the keypad 32 via the inputs 34, which is determined at 58.

While a couple examples of control systems for activating a vehicle door lock have been described above, it will be appreciated the present disclosure is not intended to be limited solely to those examples. Rather, any number of suitable control systems for activating a vehicle door lock other than those described above may certainly be used/implemented, and thus, the present disclosure is not limited to any particular control system(s). Additionally, it will be further appreciated that the present disclosure is not intended to be limited to the steps in the examples described above being performed in any particular order, as different orders of the steps (e.g., those illustrated in FIG. 3) are certainly possible.

It should be understood that all references to direction and position, unless otherwise indicated, refer to the orientation of the parking brake actuator illustrated in the drawings. In general, up or upward generally refers to an upward direction within the plane of the paper and down or downward generally refers to a downward direction within the plane of the paper.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method for preventing inadvertent operation of a vehicle access system that includes a plurality of inputs, comprising:
providing a keypad operable to output signals to actuate a vehicle door lock based on entry of a code via the inputs;
detecting when a predetermined code is inputted via the inputs and outputting a signal to actuate the vehicle door lock to control access to the vehicle; and
operating the keypad in a disabled mode wherein inputting said predetermined code does not result in outputting a signal to actuate the vehicle door lock, and wherein when the keypad is not in the disabled mode activation of an input results in a corresponding output signal being outputted and when the disabled mode is activated the output signals are not outputted.

2. The method of claim 1 wherein the disabled mode is activated by detecting entry of a disable code via the inputs.

3. The method of claim 2 wherein the disable code is activated by at least one of simultaneously activating two or more inputs, consecutively activating inputs in a preset sequence, activating one or more inputs for at least a threshold duration.

4. The method of claim 1 wherein the disabled mode is activated without user interaction with the keypad.

5. The method of claim 1 wherein the disabled mode is activated when the vehicle transmission is in a gear other than park or when the vehicle is in motion.

6. The method of claim 1 wherein the disabled mode is activated as a function of the location of the vehicle.

7. The method of claim 6 which includes detecting vehicle proximity to a car wash and activating the disabled mode based at least in part on such detection.

8. The method of claim 1 further comprising using information from a first sensor and a second sensor to determine if the vehicle is proximate to a car wash and activating the disabled mode only when both the first sensor and second sensor provide an indication that the vehicle is proximate to a car wash.

9. The method of claim 8 wherein the first sensor includes geospatial information and the second sensor detects presence of water on at least part of the vehicle.

10. The method of claim 1 which also includes terminating the disabled mode to permit use of the keypad.

11. The method of claim 10 wherein the disabled mode is terminated in response to passage of a period of time, one or more starting or turning off events of a vehicle, actuation of a vehicle door, or as a function of the location of the vehicle.

12. The method of claim 10 wherein the disabled mode is terminated by detecting the entry of an enable code via the inputs.

13. The method of claim 12 wherein the keypad is associated with a source of illumination and when the disabled mode is started or ended the source of illumination flashes one or more times.

14. The method of claim 1 further comprising providing the keypad initially in disabled mode, and wherein the disabled mode is terminated by detecting the entry of an enable code via the inputs.

15. The method of claim 1 wherein the step of operating the keypad in a disabled mode includes detecting activation of the inputs but not outputting an output signal based on the detected activation of the inputs even if said predetermined code is entered into the keypad.

16. The method of claim 15 wherein the step of operating the keypad in a disabled mode includes detecting activation of the inputs but not outputting an output signal based on the detected activation of the inputs when the activation of the inputs does not result in entry of an enable code to terminate the disabled mode.

17. The method of claim 1 wherein, when the keypad is operated in the disabled mode, inputting said predetermined code does not result in outputting a signal from the keypad so that the vehicle access system is not actuated.

18. A method for preventing inadvertent activation of a vehicle door lock by an access control device that includes multiple inputs that may be manually activated individually or collectively by a user to provide an output signal from the access control device to a controller communicated with the vehicle door lock to selectively change the state of the vehicle door lock, the method includes actively or passively activating a disabled mode of the access control device to prevent activation of the vehicle door lock by the access control device when the disabled mode is activated, wherein when the access control device is not in the disabled mode activation of an input results in a corresponding output signal being outputted and when the disabled mode is activated the output signals are not outputted from the access control device.

19. The method of claim 18 wherein when the disabled mode is activated actuation of the inputs does not result in corresponding output signals.

20. The method of claim 19 wherein the inputs are part of a keypad and when the disabled mode is activated the keypad is disabled so that no signals are outputted from the keypad.

21. The method of claim 18 wherein the disabled mode is passively activated in response to at least one of the vehicle being in motion, or the vehicle being in a gear other than park, or the vehicle being proximate to a car wash, or water being detected on at least part of the vehicle exterior.

22. The method of claim 18 wherein the disabled mode may be terminated passively or actively.

* * * * *